Figure 1:

(No Model.)

T. J. MAYALL.
INSULATED ELECTRIC CONDUCTOR.

No. 286,036. Patented Oct. 2, 1883.

Witnesses:
Ch. Houghton
J. L. Houghton

Inventor:
Th. J. Mayall

UNITED STATES PATENT OFFICE.

THOMAS J. MAYALL, OF READING, MASSACHUSETTS.

INSULATED ELECTRIC CONDUCTOR.

SPECIFICATION forming part of Letters Patent No. 286,056, dated October 2, 1883.

Application filed March 24, 1881. (No model.)

*To all whom it may concern:*

Be it known that I, THOMAS J. MAYALL, of Reading, in the county of Middlesex and Commonwealth of Massachusetts, have invented a new and useful Improvements in Insulated Electrical Conductors, of which the following is a specification.

This invention relates to means for insulating telegraphic and other wires used for conveying electricity; and it consists in an insulating medium of vulcanized rubber and graphite, and in wires or conductors covered with or embedded in this medium.

Heretofore wires for conveying electricity have been covered with various insulating media, among which may be mentioned rubber, gutta-percha, and kerite or artificial rubber as the most successful. These materials are, however, much more costly than rubber and graphite compound, and, moreover, do not possess the same toughness and durability. In the case of rubber particularly it is easily attacked and soon rots or loses its strength. It has also been proposed to cover the wires or conductors with a compound of rubber and lamp-black; but such compound, although it contains carbonaceous matter in connection with rubber, is very different in its appearance and properties from the rubber and graphite compound. In use it soon dries up, becoming porous and brittle and useless for the purpose of insulation, whereas the rubber and graphite compound retains its integrity and insulating properties even in the most exposed places. Graphite has been incorporated in vulcanized rubber in the manufacture of journal-bearings, but it is used in such compounds on account of its lubricating properties, and performs an entirely different role or function from that which it has in this invention. There are also differences in the preparation of the compound by which it is adapted to the special purpose designed.

The present invention is based, therefore, upon the discovery of new properties in rubber and graphite compounds, involves a new application of the same which is not analogous to known uses, and is embodied in new articles of manufacture.

To insulate a telegraph wire or wires, I make a plastic compound of rubber, one pound, and graphite, two and one-half to four pounds, adding enough sulphur to aid in the vulcanization. I then cover or coat the wire or wires to be insulated with this compound evenly and uniformly on all sides of it the whole length, and then vulcanize the compound to such a degree that it retains its flexibility and it is ready for use. Several wires may be inclosed in one cover, care being taken that each and every wire is perfectly insulated. This can be done by so arranging the several wires that they are parallel with and at equal distances from each other, and that all the space between them is perfectly filled with the plastic rubber, sulphur, and graphite compound. This may be done in several different ways. The rubber, sulphur, and graphite compound is first run out into sheets of suitable thickness. Then it is cut into strips of the width required, which is determined by the number of wires to be insulated. The wires may then be inclosed by laying them between two strips of the rubber, sulphur, and graphite compound, or by laying them on one strip and then rolling it up transversely. In both ways the compound must be submitted to pressure sufficient to weld it perfectly into a homogeneous whole and then vulcanized. Several wires may be coated singly and then laid together and pressed into the form of a belt or rope, as may be most convenient for use.

Wires insulated with a coating of the rubber, sulphur, and graphite compound, of considerable thickness and vulcanized—say about one-half inch—may be laid in the ground without any other protection, and will remain in a state of perfect insulation for a great length of time.

It is obvious that the temperature and time employed in the vulcanization may be varied within considerable limits according to the degree of flexibility which it is desired for the vulcanized compound to have. In preparing the unvulcanized compound, the rubber, graphite, and sulphur are to be intimately mixed by grinding together for, say, from one to two hours.

Figure 2:
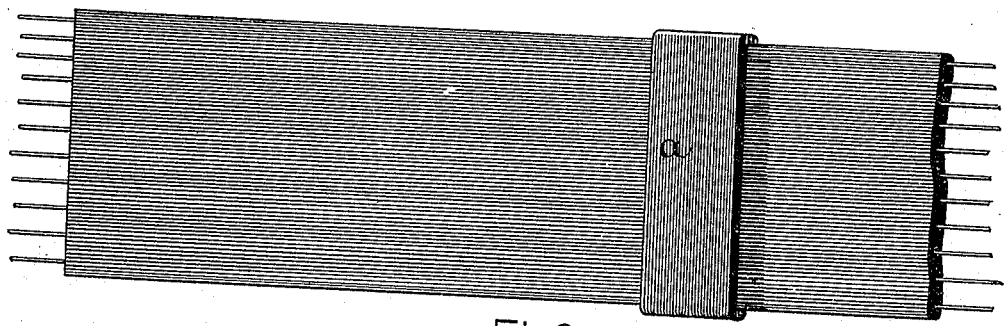
Figure 3:
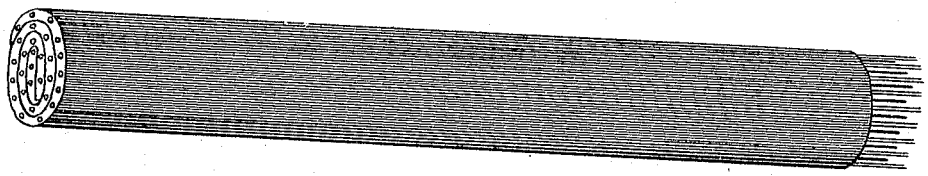

In the drawings annexed, Figure 1 shows a single wire insulated by the coating of rubber and graphite compound vulcanized. Fig. 2 shows a gang of wires insulated between two strips of the rubber and graphite compound which have been welded into a homogeneous whole by pressure and vulcanized. Fig. 3 shows a bundle of insulated wires made up by laying the wires parallel on a flat strip of the rubber and graphite compound, and then rolling up, transversely inclosing the wires, and then welding the rubber by pressure and vulcanizing.

*a* in Fig. 2 is a band of rubber and graphite compound around the joining of two pieces of the strap or belt.

I claim as new and of my invention—

1. As an electrical insulating medium, a compound of rubber, sulphur, and graphite vulcanized, substantially as described.

2. A telegraph-wire or electrical conductor covered or enveloped in an insulating coating of rubber, sulphur, and graphite composition vulcanized, substantially as described.

THOS. J. MAYALL.

Witnesses:
CHS. HOUGHTON,
F. L. HOUGHTON.